(12) United States Patent
Yamamoto

(10) Patent No.: US 11,537,382 B2
(45) Date of Patent: Dec. 27, 2022

(54) UPDATING CONTROL DEVICE, CONTROL METHOD, AND COMPUTER PROGRAM

(71) Applicant: SUMITOMO ELECTRIC INDUSTRIES, LTD., Osaka (JP)

(72) Inventor: Yusuke Yamamoto, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 99 days.

(21) Appl. No.: 16/614,920

(22) PCT Filed: Mar. 26, 2018

(86) PCT No.: PCT/JP2018/012073
§ 371 (c)(1),
(2) Date: Nov. 19, 2019

(87) PCT Pub. No.: WO2018/230084
PCT Pub. Date: Dec. 20, 2018

(65) Prior Publication Data
US 2020/0192656 A1    Jun. 18, 2020

(30) Foreign Application Priority Data
Jun. 13, 2017   (JP) .............................. JP2017-116109

(51) Int. Cl.
*G06F 8/65*       (2018.01)
*B60W 50/00*   (2006.01)

(52) U.S. Cl.
CPC .............. *G06F 8/65* (2013.01); *B60W 50/00* (2013.01); *B60W 2050/0075* (2013.01); *B60W 2050/0083* (2013.01); *B60W 2556/45* (2020.02)

(58) Field of Classification Search
CPC ...... G06F 8/60–66; G06F 8/65; B60W 50/00; B60W 2556/45; B60W 2050/0075; B60W 2050/0083
See application file for complete search history.

(56) References Cited

U.S. PATENT DOCUMENTS

2007/0174686 A1*  7/2007  Douglas .............. G06F 11/2097
                                                                        714/13
2010/0318666 A1* 12/2010  Gallagher ........... G06F 11/2005
                                                                        709/228
(Continued)

FOREIGN PATENT DOCUMENTS

JP        2015-37938 A       2/2015
JP        2015-212880 A     11/2015
(Continued)

OTHER PUBLICATIONS

Onuma, Yutaka, Yoshiaki Terashima, and Ryozo Kiyohara. "ECU software updating in future vehicle networks." 2017 31st International Conference on Advanced Information Networking and Applications Workshops (WAINA). IEEE, Mar. 2017. (Year: 2017).*

(Continued)

*Primary Examiner* — S. Sough
*Assistant Examiner* — Joanne G Macasiano
(74) *Attorney, Agent, or Firm* — Oliff PLC

(57) ABSTRACT

Provided is an update control device including: a communication unit configured to communicate with an on-vehicle control device via a transmission path including an in-vehicle communication line; and a control unit configured to cause the communication unit to transmit a request message when a target device defined below is unable to execute an update process for a control program, the request message requesting an alternative device, which is a non-target device defined below, to alternatively execute a part of the update process. Target device: an on-vehicle control device (Continued)

whose control program is to be updated. Non-target device: an on-vehicle control device whose control program is not to be updated.

13 Claims, 10 Drawing Sheets

(56) References Cited

U.S. PATENT DOCUMENTS

| | | |
|---|---|---|
| 2015/0317103 A1 | 11/2015 | Niwa |
| 2015/0363210 A1* | 12/2015 | Wehrman ................. G06F 8/65 701/31.5 |
| 2017/0192770 A1 | 7/2017 | Ujiie et al. |
| 2017/0220332 A1* | 8/2017 | Srinivasan ............. H04L 67/34 |
| 2017/0228236 A1 | 8/2017 | Nakahara et al. |
| 2018/0088931 A1* | 3/2018 | Caushi ................ G06F 16/1847 |
| 2018/0246712 A1* | 8/2018 | Aizawa ................... E02F 9/265 |
| 2020/0310782 A1 | 10/2020 | Ujiie et al. |

FOREIGN PATENT DOCUMENTS

| | | |
|---|---|---|
| JP | 2017-059211 A | 3/2017 |
| JP | 2017-097851 A | 6/2017 |
| WO | 2016/047312 A1 | 3/2016 |

OTHER PUBLICATIONS

Martorell123, Hélène, et al. "Improving Adaptiveness of AUTOSAR Embedded Applications." (Year: 2014).*

Jun. 5, 2018 Search Report issued in International Patent Application No. PCT/JP2018/012073.

Hidetoshi, Teraoka et el. "a difference update method for in-vehicle ECU," a consumer and systems(CDS), Japan, Information Processing Society, Jan. 26, 2016, pp. 1-8.

Nov. 30, 2021 Office Action issued in Japanese Patent Application No. 2019-525106.

* cited by examiner

UPDATING CONTROL DEVICE, CONTROL METHOD, AND COMPUTER PROGRAM

TECHNICAL FIELD

The present invention relates to an update control device, a control method, and a computer program.

This application claims priority on Japanese Patent Application No. 2017-116109 filed on Jun. 13, 2017, the entire contents of which are incorporated herein by reference.

BACKGROUND ART

In the automotive field in recent years, vehicles have become advanced in functionality, and a diverse range of devices are installed in vehicles. Accordingly, vehicles are equipped with large numbers of control devices, so-called ECUs (Electronic Control Units), for controlling these on-vehicle devices.

Various types of ECUs have been adopted, such as ECUs regarding traveling that control an engine, a brake, an EPS (Electric Power Steering), and the like in response to operations on an accelerator, a brake, and a handle, body-type ECUs that control ON/OFF of interior lights and headlights, sound of an alarm unit, and the like in response to switch operations performed by an occupant, and meter-type ECUs that control operations of meters arranged near the driver's seat.

Generally, an ECU consists of an arithmetic processing unit such as a microcomputer, and implements control of an on-vehicle device by reading out a control program stored in an ROM (Read Only Memory) and executing the read control program.

Regarding a control program of an ECU, an old version thereof needs to be overwritten with a new version thereof in response to upgrading of the control program for the purpose of function improvement, crime prevention, etc. In addition, data, such as map information and control parameters, necessary for execution of the control program also needs to be overwritten.

For example, Patent Literature 1 discloses a technology (online update function) of updating a program by using a program for update that is downloaded through a network.

CITATION LIST

Patent Literature

PATENT LITERATURE 1: Japanese Laid-Open Patent Publication No. 2015-37938

SUMMARY OF INVENTION

An update control device according to one embodiment is an update control device including: a communication unit configured to communicate with an on-vehicle control device via a transmission path including an in-vehicle communication line; and a control unit configured to cause the communication unit to transmit a request message when a target device defined below is unable to execute an update process for a control program. The request message requests an alternative device, which is a non-target device defined below, to alternatively execute a part of the update process.

Target device: an on-vehicle control device whose control program is to be updated.

Non-target device: an on-vehicle control device whose control program is not to be updated.

A control method according to another embodiment is a control method used in an update control device configured to communicate with an on-vehicle control device via a transmission path including an in-vehicle communication line. The method includes transmitting a request message when a target device defined below is unable to execute an update process for a control program. The request message requests an alternative device, which is a non-target device defined below, to alternatively execute a part of the update process.

Target device: an on-vehicle control device whose control program is to be updated.

Non-target device: an on-vehicle control device whose control program is not to be updated.

A computer program according to still another embodiment is a computer program for causing a computer to function as an update control device configured to communicate with an on-vehicle control device via a transmission path including an in-vehicle communication line. The computer program causes the computer to function as: a communication unit configured to communicate with an on-vehicle control device via a transmission path including an in-vehicle communication line; and a control unit configured to cause the communication unit to transmit a request message when a target device defined below is unable to execute an update process for a control program. The request message requests an alternative device, which is a non-target device defined below, to alternatively execute a part of the update process.

Target device: an on-vehicle control device whose control program is to be updated.

Non-target device: an on-vehicle control device whose control program is not to be updated.

DESCRIPTION OF EMBODIMENTS

Figure 1:
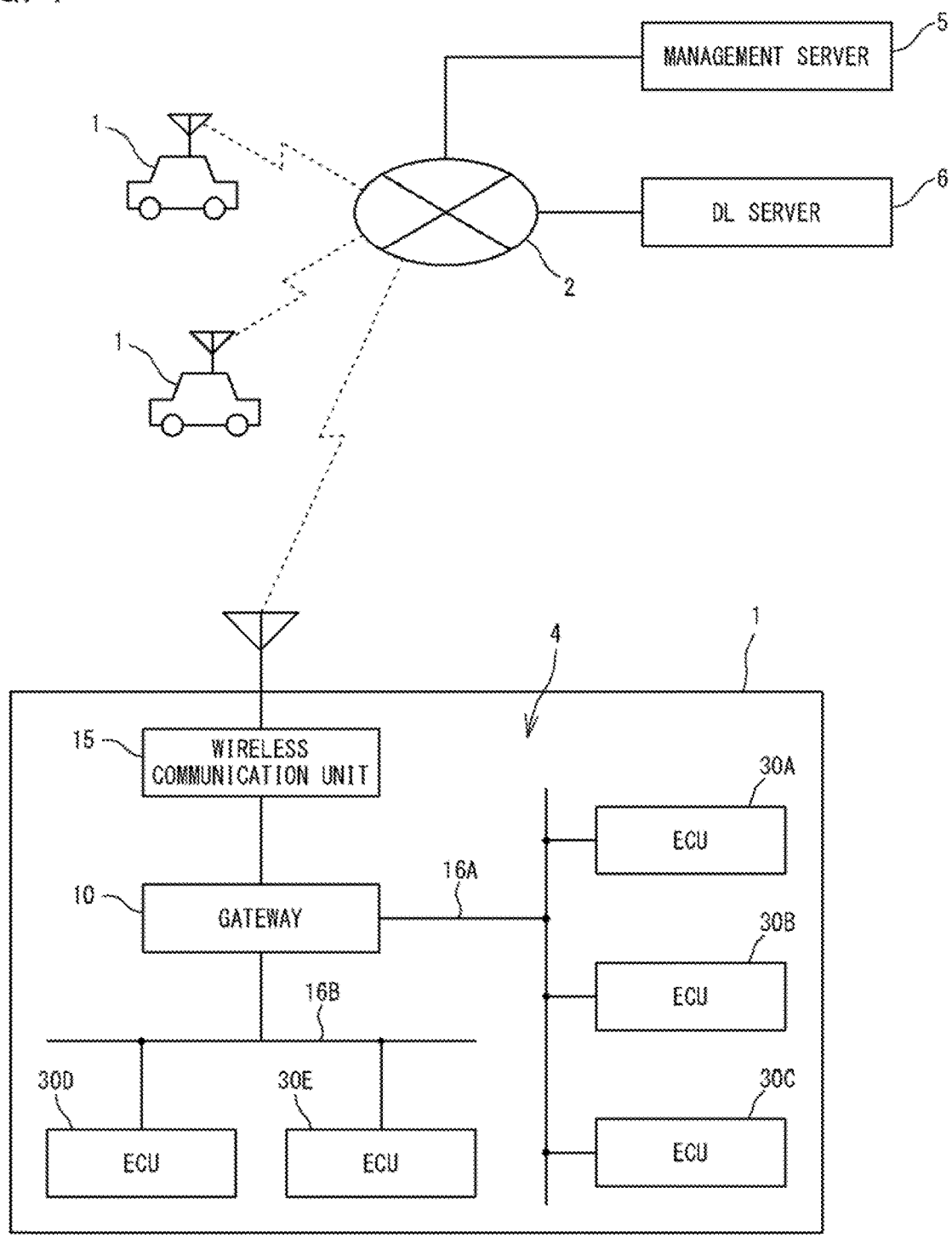
FIG. 1 is a diagram showing an overall configuration of a program updating system.

<Problems to be Solved by the Present Disclosure>

In the online update as disclosed in Patent Literature 1, if an ECU that is instructed to update a control program thereof is in a state where the ECU cannot execute update, it is assumed that an update program downloaded through a network is temporarily stored in a control device such as a gateway, and when the ECU becomes able to execute update, the update program is transferred from the control device and then update is started. The state where update of a control program cannot be executed is, for example, a state where a target ECU is an ECU for controlling a function related to traveling and a vehicle is traveling, or a state where the target ECU is not activated.

In this case, since the control device stores the update program in a memory, the memory is burdened. In particular, in view of high functionalization of ECUs in recent years, memories may be significantly burdened because of large-sized update programs or a plurality of ECUs required to be simultaneously updated.

In the case where the control device transfers the update program after the target ECU has become able to execute update and then update is started in the ECU, the time period from when the ECU becomes able to execute update to when the update is completed is increased. In particular, when there are a plurality of ECUs required to be simultaneously updated, since updates of the respective ECUs are started after the ECUs have become able to execute the updates, the time period required until completion of the updates of all the ECUs is increased.

An object in one aspect of the present disclosure is to provide an update control device, a control method, and a computer program for controlling update in an on-vehicle control device when the on-vehicle control device is unable to update a control program thereof.

<Effects of the Present Disclosure>

According to this disclosure, it is possible to control update in an on-vehicle control device when the on-vehicle control device is unable to update a control program thereof.

DESCRIPTION OF EMBODIMENTS

Embodiments of the present disclosure include at least the following.

(1) An update control device included in the present embodiments includes: a communication unit configured to communicate with an on-vehicle control device via a transmission path including an in-vehicle communication line; and a control unit configured to cause the communication unit to transmit a request message when a target device defined below is unable to execute an update process for a control program. The request message requests an alternative device, which is a non-target device defined below, to alternatively execute a part of the update process.

Target device: an on-vehicle control device whose control program is to be updated.

Non-target device: an on-vehicle control device whose control program is not to be updated.

Thus, even when the on-vehicle control device as an update target is unable to execute the update process for the control program, at least a part of the update process is executed by the alternative device. Therefore, in contrast to the case where the update program is stored in a single device until the on-vehicle control device as the update target becomes able to execute the update process for the control program, the update program can be distributed to different storage destinations, thereby preventing a memory of the single device from being burdened. In addition, start of the update control process can be expedited, thereby inhibiting delay of update completion in the on-vehicle control device as the update target.

(2) Preferably, the control unit causes the communication unit to transmit, to the non-target device, an inquiry message that inquires whether or not the non-target device can serve as the alternative device, and determines whether or not to use the non-target device as the alternative device, in accordance with the content of a response message from the non-target device.

Thus, the alternative device can be determined in accordance with the content of the response from the non-target device.

(3) Preferably, the control unit inquires of a plurality of non-target devices as to whether or not the non-target devices can serve as the alternative device, in accordance with priority levels of the non-target devices.

Thus, the on-vehicle control device whose priority level is high can be determined as the alternative device.

(4) Preferably, when the control unit has received a response message indicating that dynamic processing capability is not lower than a predetermined value, the control unit determines, as the alternative device, the non-target device that has transmitted the response message.

Thus, the on-vehicle control device whose dynamic processing capability is high can be determined as the alternative device. As a result, the on-vehicle control device determined as the alternative device can be prevented from being overloaded.

(5) Preferably, the control unit determines the alternative device from among a plurality of non-target devices that have transmitted response messages, in accordance with priority levels of the non-target devices.

Thus, an appropriate on-vehicle control device can be determined as the alternative device.

(6) Preferably, in a case where a plurality of in-vehicle communication lines are terminated at the communication unit and the communication unit does not have a function of selectively activating devices connected to the in-vehicle communication lines, the control unit regards a non-target device that is connected to an in-vehicle communication line to which the target device is connected, to be higher in priority than a non-target device that is connected to an in-vehicle communication line to which the target device is not connected.

In the case where the communication unit does not have the function of selectively activating the devices connected to the in-vehicle communication lines, if data is transferred through one in-vehicle communication line, all the on-vehicle control devices connected to this in-vehicle communication line are activated. In this case, it is possible to avoid a situation that, by selecting, as the alternative device, an on-vehicle control device connected to the in-vehicle communication line to which the on-vehicle control device as the update target is not connected, other on-vehicle control devices connected to the in-vehicle communication line to which the alternative device is connected are undesirably activated even when these on-vehicle control devices are not to be activated.

(7) Preferably, the control unit regards a non-target device that has a control function unrelated to traveling of a vehicle, to be higher in priority than a non-target device that has a function other than the control function.

Thus, even in the case where a part of the update process to be alternatively executed by the non-target device is likely to affect the process to be originally executed by the non-target device, vehicle traveling can be prevented from being affected.

(8) Preferably, the update process includes a plurality of processes, and the control unit determines a process, among the plurality of processes, for which the alternative device is requested to alternatively execute the process.

Thus, completion of update in the on-vehicle control device as the update target can be expedited while inhibiting the alternative on-vehicle control process from being overloaded.

(9) A control method included in the present embodiments is a method for controlling update of a control program in an on-vehicle control device, in the update control device according to any one of the above (1) to (8).

This control method provides the same effects as those of the update control devices according to the above (1) to (8).

(10) A computer program included in the present embodiments causes a computer to function as the update control device according to any one of the above (1) to (8).

This computer program provides the same effects as those of the update control devices according to the above (1) to (8).

Detailed Description of Embodiments

Hereinafter, preferred embodiments will be described with reference to the drawings. In the following description, the same reference numerals refer to the same components and constituent elements. The names and functions thereof are also the same. Therefore, repeated description thereof is not necessary.

First Embodiment

[Overall Configuration of System]

FIG. 1 is a diagram showing an overall configuration of a program updating system according to an embodiment.

As shown in FIG. 1, the program updating system of this embodiment includes vehicles 1, a management server 5, and a DL (download) server 6 which are communicable with each other via a communication network which is a wide-area communication network 2, for example.

The management server 5 manages update information of each vehicle 1. The DL server 6 stores therein update programs. The management server 5 and a DL server 6 are operated by, for example, the automobile manufacturer of the vehicles 1, and are communicable with large numbers of vehicles 1 owned by users registered as members in advance.

Each vehicle 1 is provided with: an in-vehicle network (communication network) 4 including a plurality of ECUs 30 and a gateway 10 which are connected via in-vehicle communication lines 16; a wireless communication unit 15; and various on-vehicle devices (not shown) controlled by the respective ECUs 30.

The in-vehicle network 4 has a plurality of in-vehicle communication lines 16A and 16B. The in-vehicle network 4 includes a plurality of communication groups, i.e., ECUs 30A to 30C bus-connected to the in-vehicle communication line 16A and ECUs 30D and 30E bus-connected to the in-vehicle communication line 16B. The gateway 10 relays communication between the communication groups. Therefore, the in-vehicle communication lines 16A and 16B are connected to the gateway 10. The in-vehicle communication lines 16A and 16B are also collectively referred to as an in-vehicle communication line 16.

The wireless communication unit 15 is communicably connected to the wide-area communication network 2 such as a mobile phone network, and is connected to the gateway 10 via an in-vehicle communication line. The wireless communication unit 15 receives information from external devices such as the management server 5 and the DL server 6 via the wide-area communication network 2, and the gateway 10 transmits the information to the ECUs 30 via the in-vehicle communication line.

The gateway 10 transmits information obtained from the ECUs 30 to the wireless communication unit 15, and the wireless communication unit 15 transmits the information to the external devices such as the management server 5.

The ECUs 30 exchange information via the in-vehicle communication line.

As for the wireless communication unit 15 installed in the vehicle 1, devices such as a mobile phone, a smart phone, a tablet-type terminal, and a notebook PC (Personal Computer) possessed by the user are conceivable in addition to an on-vehicle exclusive communication terminal.

FIG. 1 shows an exemplary case where the gateway 10 communicates with the external devices via the wireless communication unit 15. However, if the gateway 10 has a wireless communication function, the gateway 10 itself may wirelessly communicate with the external devices such as the management server 5.

In the program updating system shown in FIG. 1, the management server 5 and the DL server 6 are configured as separate servers. However, these servers 5 and 6 may be configured as a single server unit. Each of the management server 5 and the DL server 6 may be composed of a plurality of devices.

The program updating system may include, instead of (or in addition to) the DL server 6, an external device that stores therein update programs and is communicable with the gateway 10 wirelessly or via wires.

[Internal Configuration of Gateway]

Figure 2:
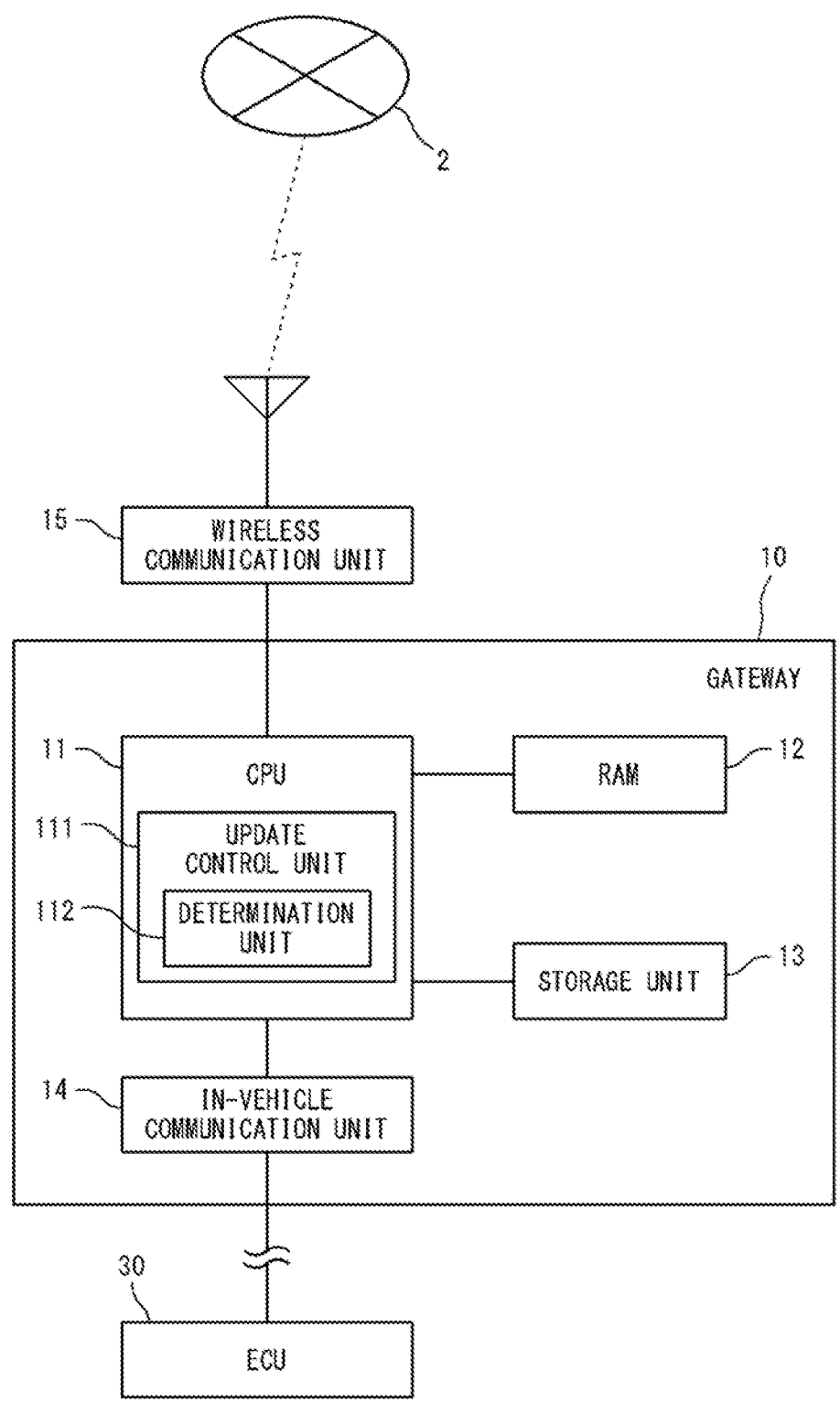
FIG. 2 is a block diagram showing an internal configuration of a gateway.

FIG. 2 is a block diagram showing the internal configuration of the gateway 10.

As shown in FIG. 2, the gateway 10 includes a CPU 11, an RAM (Random Access Memory) 12, a storage unit 13, an in-vehicle communication unit 14, and the like. Although the gateway 10 is connected to the wireless communication unit 15 via the in-vehicle communication line, the gateway 10 and the wireless communication unit 15 may be configured as a single device.

The CPU 11 causes the gateway 10 to function as a relay device for relaying various kinds of information, by reading out one or a plurality of programs stored in the storage unit 13 to the RAM 12 and executing the read programs.

The CPU 11 can execute a plurality of programs in parallel by switching between the programs in a time sharing manner, for example. The CPU 11 may be a CPU representing a plurality of CPU groups. In this case, a function to be implemented by the CPU 11 is a function to be implemented by the plurality of CPU groups in cooperation with each other. The RAM 12 consists of a memory element such as an SRAM (Static RAM) or a DRAM (Dynamic RAM), and temporarily stores therein programs to be executed by the CPU 11, data required in executing the programs, and the like.

A computer program implemented by the CPU 11 can be transferred in a state of being recorded in a well-known recording medium such as a CD-ROM or a DVD-ROM, or may be transferred by data transmission from a computer device such as a server computer.

In this aspect, the same applies to a computer program executed by a CPU 31 of the ECU 30 (refer to FIG. 3) described later, and a computer program executed by a CPU 51 of the management server 5 (refer to FIG. 4) described later.

In the following description, transfer (transmission) of data from a host device to a client device is also referred to as "download".

The storage unit 13 consists of a nonvolatile memory element, such as a flash memory or an EEPROM, and the like. The storage unit 13 stores therein programs to be executed by the CPU 11, data required for execution of the programs, and the like, and also stores therein update programs, to be downloaded, for the respective ECUs 30 received from the DL server 6, and the like.

The plurality of ECUs 30 are connected to the in-vehicle communication unit 14 via the in-vehicle communication lines 16 arranged in the vehicle 1. The in-vehicle communication unit 14 communicates with the ECUs 30 according to the standard of CAN (Controller Area Network), for example. The communication standard adoptable by the in-vehicle communication unit 14 is not limited to CAN. Other standards such as CANFD (CAN with Flexible Data Rate), LIN (Local Interconnect Network), Ethernet (registered trademark), or MOST (Media Oriented Systems Transport: MOST is registered trademark) may be adopted. The plurality of in-vehicle communication lines 16A and 16B may include communication lines based on different communication standards.

The in-vehicle communication unit 14 transmits information provided from the CPU 11 to target ECUs 30, and provides information received from the ECUs 30 to the CPU 11. The in-vehicle communication unit 14 may communicate with the ECUs 30 according to other communication standards that are used for the in-vehicle network 4, apart from the above communication standards.

The wireless communication unit 15 includes a wireless communication apparatus including an antenna and a communication circuit that executes transmission/reception of radio signals from the antenna. The wireless communication unit 15 is able to communicate with the external devices when being connected to the wide-area communication network 2 such as a mobile phone network.

The wireless communication unit 15 transmits information provided from the CPU 11 to the external devices such as the management server 5 via the wide-area communication network 2 formed by a base station (not shown), and provides information received from the external devices to the CPU 11.

Instead of the wireless communication unit 15 shown in FIG. 2, a communication unit that functions as a relay device inside the vehicle 1 may be adopted. This communication unit may have a connector to which a communication cable conforming to a standard such as USB (Universal Serial Bus) or RS232C is connected, and may perform wired communication with another communication device connected thereto via the communication cable. Alternatively, this communication unit may have an interface conforming to a standard such as Bluetooth (registered trademark) or Wi-Fi (Wireless Fidelity: registered trademark), and may perform wireless communication with another communication device connected thereto via short-range radio.

If the other communication device and the external device such as the management server 5 can wirelessly communicate with each other via the wide-area communication network 2, the external device and the gateway 10 become communicable with each other through a communication path consisting of, in this order, the external device, the other communication device, the communication unit, and the gateway 10.

[Internal Configuration of ECU]

Figure 3:
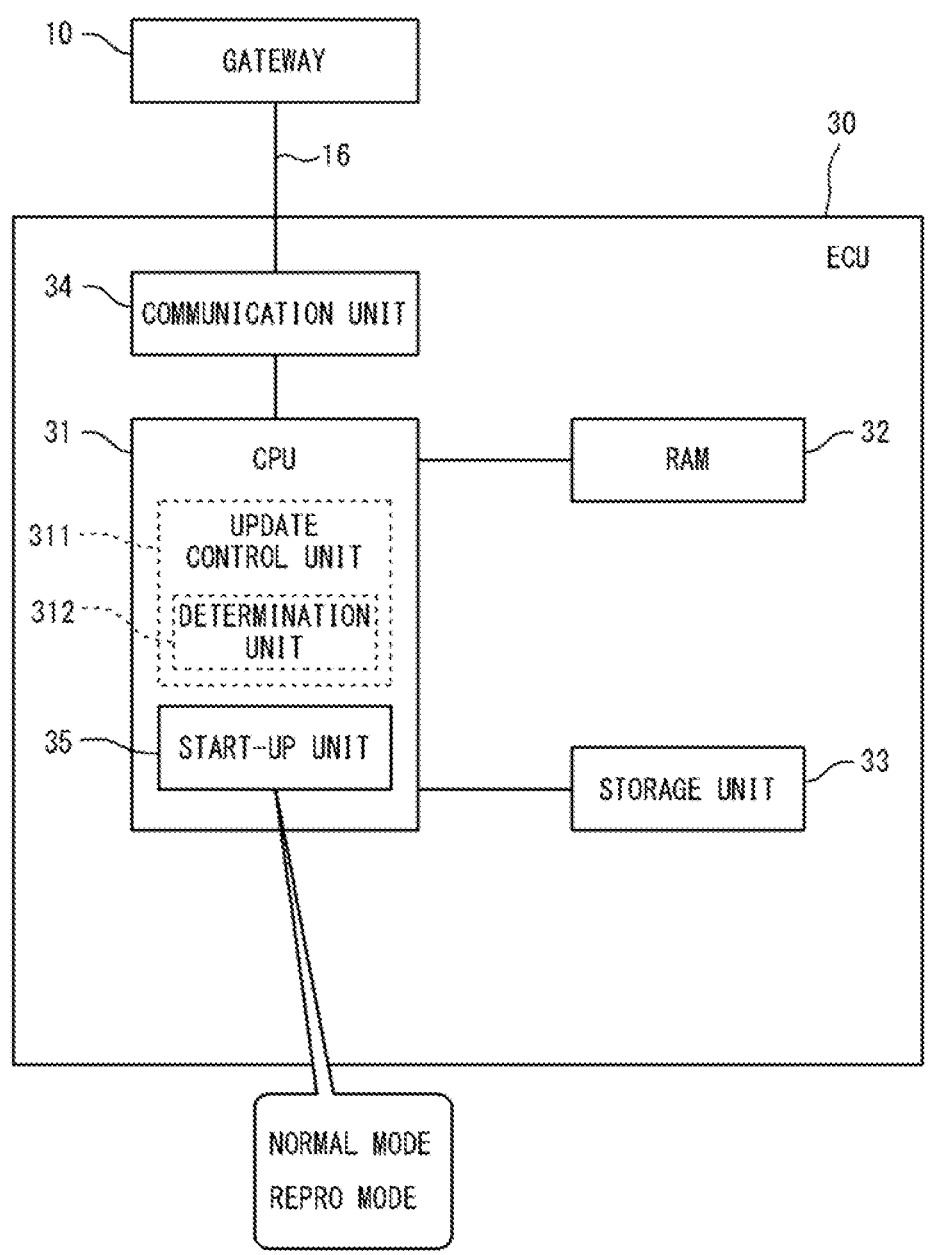
FIG. 3 is a block diagram showing an internal configuration of an ECU.

FIG. 3 is a block diagram showing the internal configuration of an ECU 30.

As shown in FIG. 3, the ECU 30 includes a CPU 31, an RAM 32, a storage unit 33, a communication unit 34, and the like. The ECU 30 is an on-vehicle control device that separately controls a target device installed in the vehicle 1. Examples of the types of ECUs 30 include a power supply control ECU, an engine control ECU, a steering control ECU, and a door lock control ECU.

The CPU 31 controls the operation of a target device under the charge of the CPU 31, by reading out one or a plurality of programs previously stored in the storage unit 33 to the RAM 32 and executing the read program. The CPU 31 may also be a CPU representing a plurality of CPU groups, and a control to be performed by the CPU 31 may be performed by the plurality of CPU groups in cooperation with each other.

The RAM 32 consists of a memory element such as an SRAM or a DRAM, and temporarily stores therein programs to be executed by the CPU 31, data required in executing the programs, and the like.

The storage unit 33 consists of, for example, a nonvolatile memory element such as a flash memory or an EEPROM, or a magnetic storage device such as a hard disk.

The storage unit 33 stores therein programs to be read and executed by the CPU 31. Examples of information stored in the storage unit 33 include: a computer program that causes the CPU 31 to execute information processing for controlling target equipment that is an in-vehicle control target; and a control program as data to be used in executing the program, such as parameters and map information.

The gateway 10 is connected to the communication unit 34 via the in-vehicle communication line arranged in the vehicle 1.

The communication unit 34 communicates with the gateway 10 according to a standard such as CAN, Ethernet, or MOST, for example.

The communication unit 34 transmits information provided from the CPU 31 to the gateway 10, and provides information received from the gateway 10 to the CPU 31. The communication unit 34 may communicate with the gateway 10 according to other communication standards that are used for the on-vehicle network, apart from the above communication standards.

The CPU 31 of the ECU 30 includes a start-up unit 35 that switches the mode of control performed by the CPU 31 between a "normal mode" and a "reprogramming mode" (hereinafter also referred to as "repro mode").

The normal mode is a control mode in which the CPU 31 of the ECU 30 executes original control for the target device (e.g., engine control for a fuel engine or door lock control for a door lock motor).

The reprogramming mode is a control mode in which the CPU 31 updates the control program used for controlling the target device.

That is, the reprogramming mode is a control mode in which the CPU 31 performs erasing/overwriting of data of the control program from/on an ROM area in the storage unit 33. The CPU 31 in this control mode is able to update, to a new version, the control program stored in the ROM area in the storage unit 33.

In the repro mode, when the CPU 31 writes the new version of the control program into the storage unit 33, the start-up unit 35 temporarily restarts (resets) the ECU 30, and executes a verifying process on a storage area where the new version of the control program has been written.

After completion of the verifying process, the start-up unit 35 operates the CPU 31 with the updated control program.

A process of downloading an update program to an ECU 30 from the DL server 6 via the gateway 10 and updating the control program by using the update program, is also referred to as online update.

[Internal Structure of Management Server]

Figure 4:
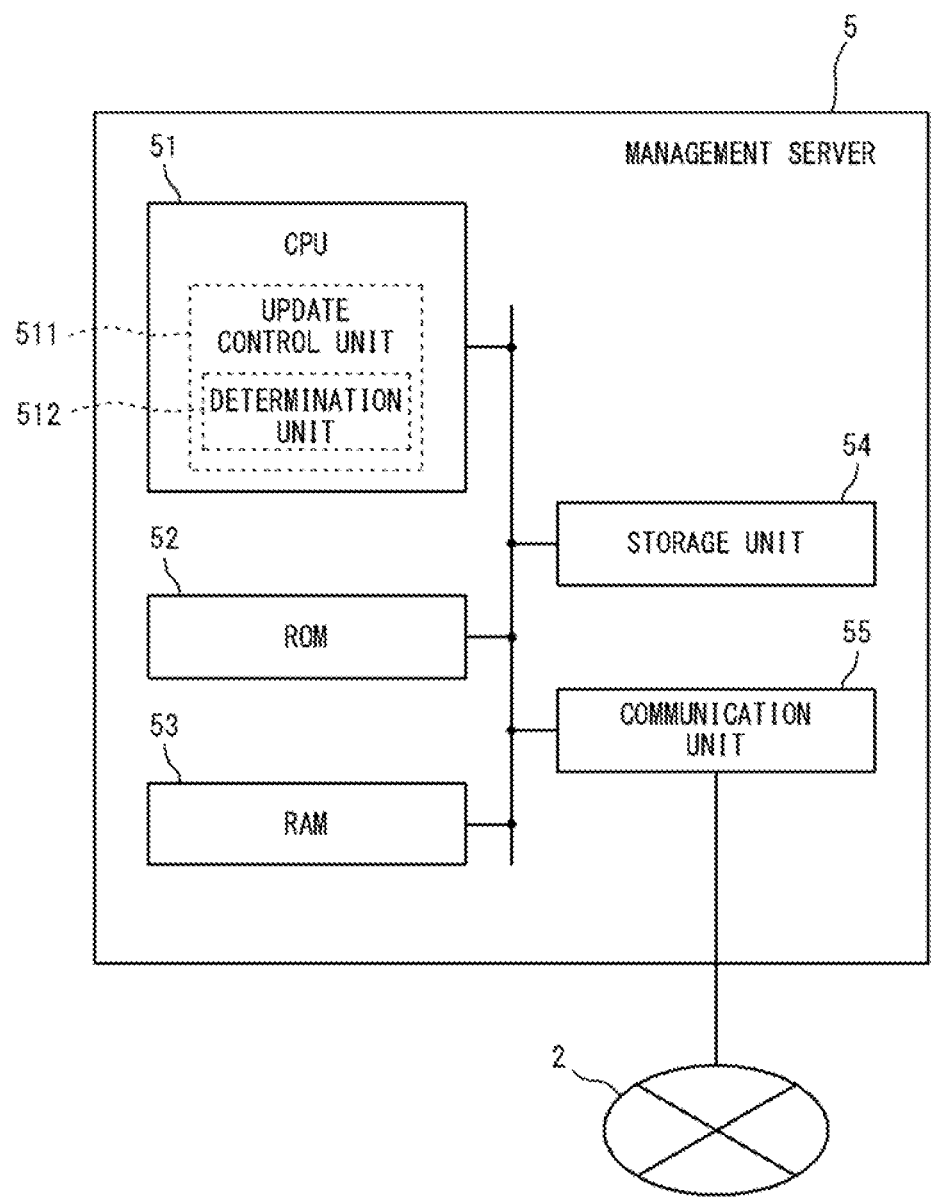
FIG. 4 is a block diagram showing an internal configuration of a management server.

FIG. 4 is a block diagram showing the internal structure of the management server 5.

As shown in FIG. 4, the management server 5 includes a CPU 51, an ROM 52, an RAM 53, a storage unit 54, a communication unit 55, and the like.

By reading out one or a plurality of programs previously stored in the ROM 52 to the RAM 53 and executing the read program, the CPU 51 controls the operation of each hardware component, and causes the management server 5 to function as an external device that is communicable with the gateway 10. The CPU 51 may also be a CPU representing a plurality of CPU groups, and a function to be implemented by the CPU 51 may be a function to be implemented by the plurality of CPU groups in cooperation with each other.

The RAM 53 consists of a memory element such as an SRAM or a DRAM, and temporarily stores therein programs to be executed by the CPU 51, data required in executing the programs, and the like.

The storage unit 54 consists of, for example, a nonvolatile memory element such as a flash memory or an EEPROM, or a magnetic storage device such as a hard disk.

The communication unit 55 consists of a communication device that executes a communication process according to a predetermined communication standard. The communication unit 55 executes the communication process while being connected to the wide-area communication network 2 such as a mobile phone network. The communication unit 55 transmits information provided from the CPU 51 to external devices via the wide-area communication network 2, and provides information received via the wide-area communication network 2 to the CPU 51.

[Control Program Updating Sequence According to Comparative Example]

Figure 5:
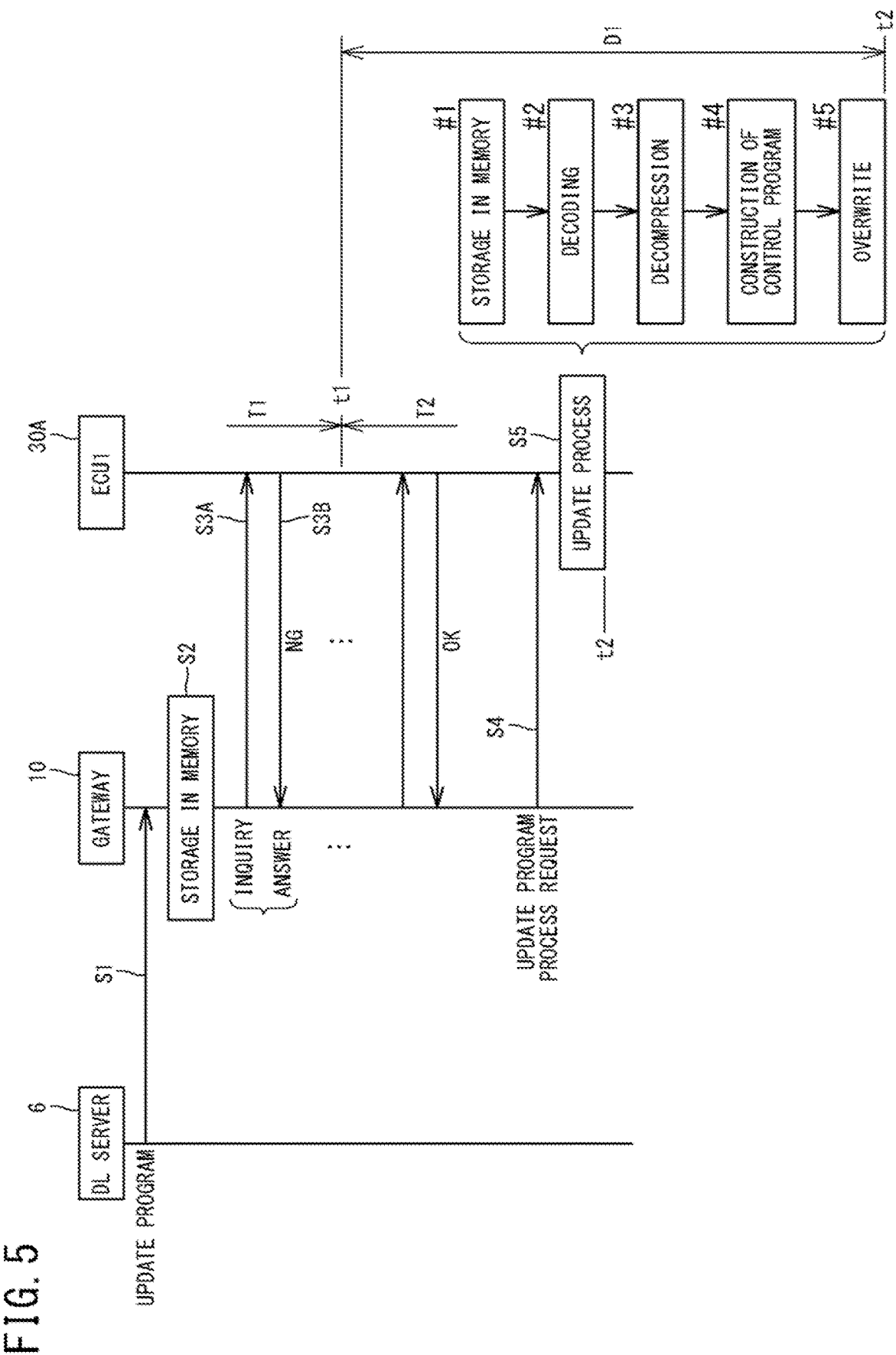
FIG. 5 is a sequence diagram showing an example of a flow of online update of a control program which is executed in a program updating system according to a comparative example.

FIG. 5 is a sequence diagram showing an example of a flow of online update of a control program which is executed in a program updating system according to a comparative example. In any of the control program updating sequence according to the comparative example and control program updating sequences according to embodiments described later, the ECU 30A shown in FIG. 1 is an ECU whose control program is to be updated (this ECU is also referred to as "target ECU"). Even when the target ECU is any of other ECUs 30 shown in FIG. 1, the same operation is performed. One or a plurality of update programs is stored in the DL server 6, and for example, the management server 5 determines a timing to update a control program of an ECU in a vehicle 1 that has been registered in advance. The timing of update may be set by, for example, the automobile manufacturer of the vehicle 1.

A control program includes not only the program itself but also data such as parameters and map information to be used in executing the program. The term "control program" represents the program and the data. Therefore, an update program includes not only the program for updating a program but also data for updating the data to be used in executing the program.

When a timing to update the control program has arrived, the management server 5 sends a notification of update to the gateway 10 of the corresponding vehicle 1. Upon receiving the notification of update from the management server 5, the gateway 10 sends a request to the DL server 6 for download of an update program. Upon receiving the download request from the gateway 10, the DL server 6 transmits, to the gateway 10, the update program to be downloaded (step S1).

The gateway 10 downloads the update program and temporarily stores the update program in the storage unit 13 (step S2). Thereafter, the gateway 10 inquires of the ECU 30A as a target ECU (abbreviated as "target ECU 30A" in this description) as to whether or not the ECU 30A is able to update the control program (step S3A).

In this description, a period T1 indicates a period during which the target ECU 30A is unable to execute update of the control program (this state is also referred to as "update unexecutable state"), and a period T2 indicates a period during which the target ECU 30A is able to execute update (this state is also referred to as "update executable state"). The period T1 is, for example, a period during which the vehicle 1 is traveling, and the period T2 is, for example, a period during which the vehicle 1 is stopped.

If the inquiry in step S3A is made during the period T1, the target ECU 30A answers that it is in the update unexecutable state (step S3B). In this case, the gateway 10 retains the update program in the storage unit 13, and repeats the request of update to the target ECU 30A at a predetermined interval.

When the period T1 has ended and the period T2 has arrived, the target ECU 30A enters the update executable state. Therefore, if the inquiry is made during the period T2, the target ECU 30A answers that it is in the update executable state. Upon receiving this answer from the target ECU 30A, the gateway 10 transmits the update program to the target ECU 30A, and requests update of the control program (step S4). In response to this request, the target ECU 30A executes an update process (step S5), whereby the control program is updated.

The update process to be executed in an ECU 30 is a series of processes that is started after the ECU 30 has received an update program from the gateway 10, and is ended when the updated (new version) control program is stored in a control program storage area in the storage unit 33. The update process includes a plurality of processes from the start to the end. As one example, the update process includes five processes #1 to #5 as follows. The processes included in the update process are not limited to these processes.

Process #1: storing a file (update program) in the storage unit 33

Process #2: subjecting an encoded file to decoding to obtain a compressed file

Process #3: subjecting the decoded and compressed file to decompression to obtain the update program Process #4: applying the update program to the control program before update (old-version control program) to construct an updated (new version) control program Process #5: writing the new-version control program over the control program storage area in the storage unit 33 to overwrite the old-version control program with the new-version control program The target ECU 30A, which has received the request of update in step S4, starts the update process from the process #1 and sequentially executes the processes up to the process #5 to complete the update process. Assuming that a processing time D corresponds to a period from when the period T1 shifts to the period T2 and the target ECU 30A enters the update executable state to when the update process is completed in the target ECU 30A, in other words, a period during which the update process is being performed in the target ECU 30A, a processing time D1 of the comparative example is a time (t2-t1) from a timing t1 at which the period T1 shifts to the period T2 to a timing t2 at which the update process in step S5 is completed in the target ECU 30A.

[Control Program Updating Sequence According to Embodiment]

Figure 6:
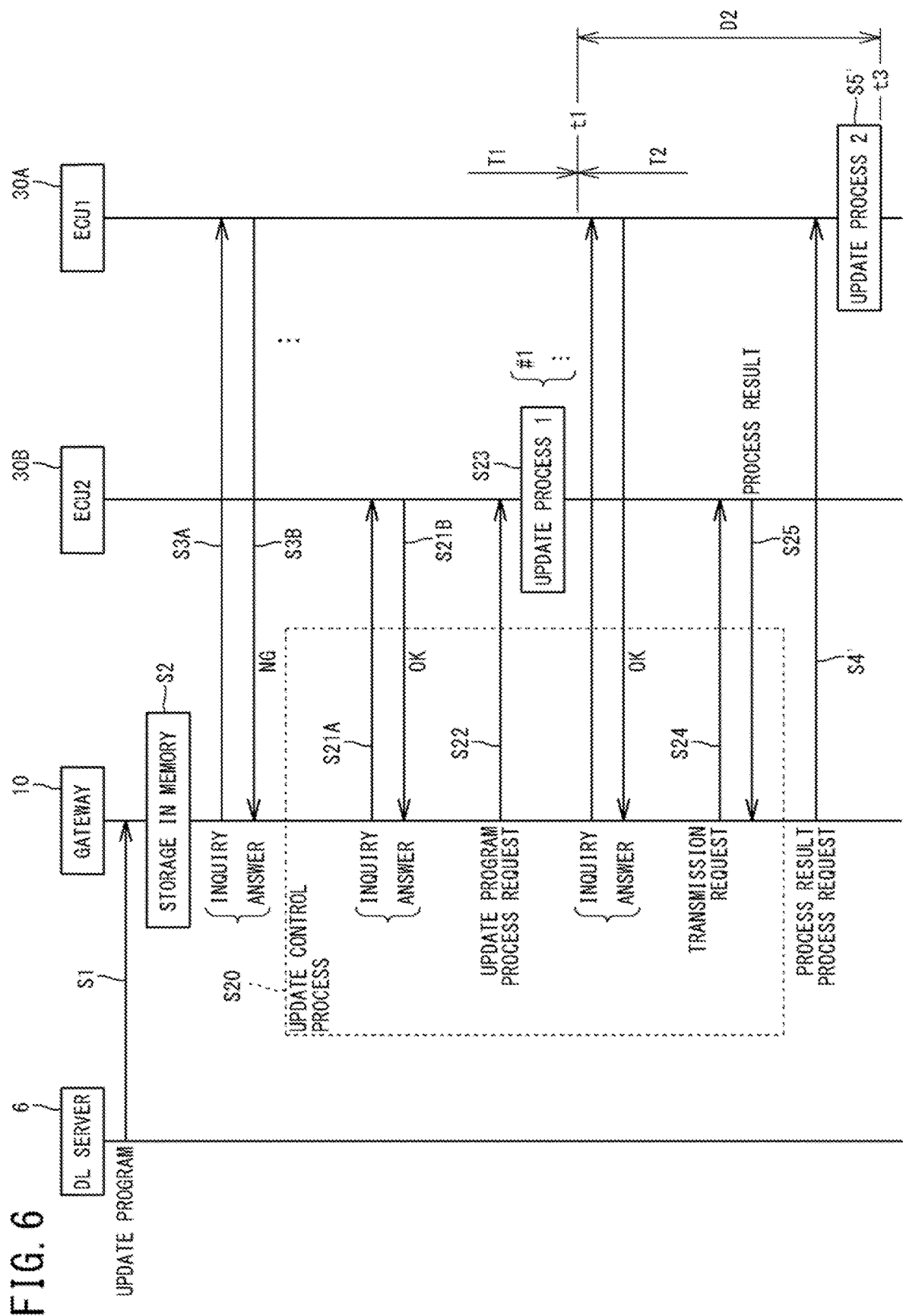
FIG. 6 is a sequence diagram showing an example of a flow of online update of a control program which is executed in a program updating system according to a first embodiment.

FIG. 6 is a sequence diagram showing an example of a flow of online update of a control program which is executed in a program updating system according to a first embodiment. In FIG. 6, the same operations as in the flow of the online update according to the comparative example shown in FIG. 5 are represented by the same step numbers.

With reference to FIG. 6, in the program updating system according to the present embodiment, the gateway 10 functions as an update control device that controls update of the control program in the target ECU 30A. When the gateway 10 has received an answer from the target ECU 30A that it is in the update unexecutable state in response to the inquiry in step S3A made within the period T1 (step S3B), the gateway 10 executes an update control process for controlling update of the control program in the target ECU 30A (step S20).

The update control process is a process in which, when the target ECU 30A is in the update unexecutable state, an ECU (also referred to as "alternative ECU") different from the target ECU 30A is caused to alternatively execute at least a part of the update process using the update program. In the example of FIG. 6, the alternative ECU is an ECU 30B shown in FIG. 1. The alternative ECU is not particularly limited to the ECU 30B and may be any of the ECUs 30 other than the target ECU. This also applies to the operations (FIG. 9, FIG. 10) of the program updating systems according to the second and third embodiments described later. The same operation as shown in FIG. 6 is performed even when an ECU 30 other than the ECU 30B is used as the alternative ECU. Specifically, with reference to FIG. 6, the gateway 10 inquires of the ECU 30B as the alternative ECU (abbreviated as "alternative ECU 30B" in this description) as to whether or not the ECU 30B is able to execute the update process (step S21A). Upon receiving an answer from the alternative ECU 30B that it is in the update executable state (step S21B), the gateway 10 transmits the update program to the alternative ECU 30B, and requests a first update process that is at least a part of the processes #1 to #5 (step S22). In response to this request, the alternative ECU 30B executes the first update process (step S23). The result of the first update process is stored in the storage unit 33 of the alternative ECU 30B.

When the period T1 has ended and the period T2 has arrived, and if the gateway 10 obtains an answer from the target ECU 30A that it is in the update executable state, the gateway 10 requests the alternative ECU 30B to transmit the result of the first update process (step S24), and acquires the result of the first update process from the alternative ECU 30B (step S25). The gateway 10 transmits the result of the first update process to the target ECU 30A, and requests a second update process that is the remaining part of the processes #1 to #5 (step S4'). In response to this request, the second update process is executed in the target ECU 30A (step S5'), whereby the control program is updated.

A processing time D2 in the target ECU 30A in the program updating system according to the present embodiment corresponds to a time (t3-t1) from a timing t1 at which the period T1 has shifted to the period T2 to a timing t3 at which the update process in step S5' is completed in the target ECU 30A. In the control program updating sequence according to the present embodiment, since a part of the update process is executed in the alternative ECU 30B during the period T1, the processing time D2 in the target ECU 30A can be made shorter than the processing time D1 in the target ECU 30A according to the comparative example.

[Functional Configuration of Gateway]

With reference to FIG. 2, the CPU 11 of the gateway 10 includes an update control unit 111 as a function of executing the update control process. The update control process includes a determination process. Therefore, the update control unit 111 includes a determination unit 112 as a function to execute the determination process. These functions are implemented in the CPU 11 when the CPU 11 reads out one or a plurality of programs stored in the storage unit 13 and executes the read program. However, at least a part of these functions may be implemented by hardware such as an electronic circuit.

(Determination Process)

The determination process includes a first process of determining an alternative ECU, and a second process of determining a process to be alternatively executed by the alternative ECU. In the first process, the determination unit 112 determines, as an alternative ECU, an ECU 30 whose dynamic processing capability is not lower than a predetermined value, e.g., an ECU 30 in which the utilization rate of the CPU 31 is not higher than a threshold value, among a plurality of ECUs 30 that are non-target devices other than the target ECU. Thus, the alternative ECU can be prevented from being overloaded.

For the first process, the determination unit 112 acquires the utilization rates of the CPUs 31 of the respective ECUs 30. As one example, the determination unit 112 inquires of each ECU 30 about the utilization rate of the CPU 31 to know whether or not the ECU 30 is able to perform the update process. The determination unit 112 generates an inquiry frame (message) obtained by adding an inquiry command to a frame having a format of transmission information in CAN communication, and causes the in-vehicle communication unit 14 to transmit the frame to the respective ECUs 30.

As one example, the determination unit 112 determines, as an alternative ECU, an ECU 30 having the lowest utilization rate of the CPU 31 among the plurality of ECUs 30. Thus, an ECU 30 having the highest dynamic processing capability is determined as an alternative ECU.

In another example, the determination unit 112 determines an alternative ECU in accordance with priority levels from among a plurality of ECUs 30 in which the utilization rates of the CPUs 31 are not higher than the threshold value. For example, the priority level of an ECU that controls a function unrelated to traveling, such as an on-vehicle media player, is set to be higher than the priority level of an ECU that controls a function related to traveling. When the alternative ECU alternatively executes a part of the update process, the part of the update process may sometimes affect a process to be originally executed by the ECU. In this case, if the alternative ECU is an ECU for controlling a function related to vehicle traveling, the part of the update process may sometimes affect vehicle traveling. Therefore, by giving a higher priority level to the ECU that controls the function unrelated to vehicle traveling, vehicle traveling can be prevented from being affected.

In another example, the priority level of an ECU connected to the same in-vehicle communication line 16 as an in-vehicle communication line 16 that connects the gateway 10 and the target ECU is set to be higher than the priority level of an ECU connected to a different in-vehicle communication line 16. Specifically, in the case where the in-vehicle network 4 has the configuration shown in FIG. 1 and the target ECU is the ECU 30A, the ECUs 30B and 30C connected to the in-vehicle communication line 16A to which the ECU 30A is connected are given higher priority levels than the ECUs 30D and 30E connected to a different in-vehicle communication line 16B. The reason is as follows. In the case where the in-vehicle communication is CAN communication and does not have a function (so-called "partial wake up") of selectively activating a plurality of devices connected to each in-vehicle communication lines 16, which is a function called "partial network", if data is transferred through one in-vehicle communication line 16, all the ECUs connected to this in-vehicle communication line 16 are activated. Therefore, if an ECU 30 connected to an in-vehicle communication line 16 to which the target ECU is not connected is used as an alternative ECU, ECUs 30 connected to the in-vehicle communication line 16 to which the alternative ECU is connected will be activated even when these ECUs are not to be activated.

In FIG. 6 and later-described FIG. 9 and FIG. 10, the ECU 30B is used as an example of the alternative ECU. It is considered that the ECU 30B is determined as the alternative ECU because the priority level thereof is higher than the priority levels of the ECUs 30D and 30E. Even when the alternative ECU 30 is the ECU 30D or 30E which are lower in priority level, the same operations as described in these figures are performed.

The determination unit 112 may make the inquiry to all the ECUs 30 installed in the vehicle 1, except the target ECU (e.g., the ECU 30A). Thus, an optimum alternative ECU can be determined. Alternatively, the determination unit 112 may make the inquiry to only ECUs having high priority levels (e.g., not lower than a predetermined priority level) among the ECUs other than the target ECU. Thus, an alternative ECU can be efficiently determined.

In the second process, the determination unit 112 determines one or more processes to be executed by the alternative ECU, among the plurality of processes (#1 to #5) included in the update process. For this purpose, the determination unit 112 compares the throughput required for each process with the dynamic processing capability of the alternative ECU. Then, the determination unit 112 determines, in order from the process #1, whether the throughput required for each process is within a specified range of the dynamic processing capability of the alternative ECU, and determines a process (processes) that satisfies this condition, as a process to be alternatively executed by the alternative ECU.

Since the throughput for each process depends on the data size of the update program, the throughput can be calculated based on the data size by storing in advance the correspondence between the data size and the throughput, for example. The data size of the update program can be acquired from the DL server 6.

In order to request the alternative ECU to execute the first update process, the update control unit 111 generates a frame (message) including a command that requests execution of the determined process, and causes the in-vehicle communication unit 14 to transmit the frame to the alternative ECU.

[Update Control Process]

Figure 7:
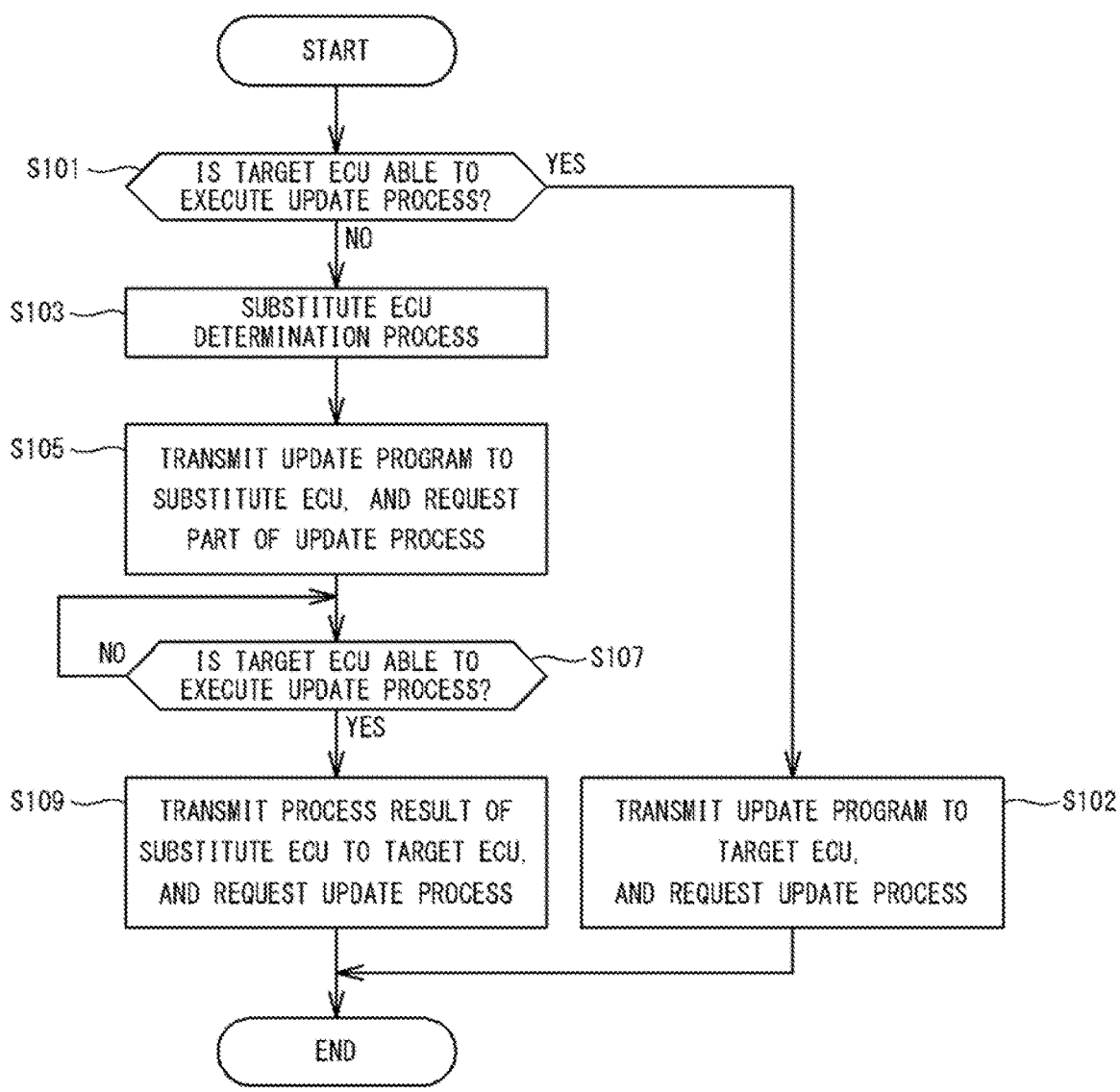
FIG. 7 is a flowchart showing the specific content of an update control process.

FIG. 7 is a flowchart showing a specific example of the update control process. The process shown in the flowchart of FIG. 7 is executed when the CPU 11 of the gateway 10 reads out one or a plurality of programs stored in the storage unit 13 onto the RAM 12 and executes the read program to implement the functions of the determination unit 112 and the update control unit 111. The process shown in FIG. 7 is started when the gateway 10 has downloaded the update program from the DL server 6.

With reference to FIG. 7, the CPU 11 inquires about the state of the target ECU (e.g., the ECU 30A) that updates the control program by using the update program, and determines whether the target ECU is in the update executable state or the update unexecutable state. When the target ECU is in the update executable state (YES in step S101), the CPU 11 transmits the update program to the target ECU and requests update (step S102).

When the target ECU is in the update unexecutable state (NO in step S101), the CPU 11 executes the determination process (step S103). Then, the CPU 11 transmits the update program to the determined alternative ECU (e.g., ECU 30B), and instructs the alternative ECU to execute the first update process that is the determined process of the update process using the update program (step S105). In step S105, the CPU 11 generates a necessary frame, and causes the in-vehicle communication unit 14 to transmit the frame to the alternative ECU.

After that, the CPU 11 again inquires about the state of the target ECU. When the target ECU has entered the update executable state (YES in step S107), the CPU 11 requests the result of the first update process from the alternative ECU, transmits the acquired result of the process to the target ECU, and requests the target ECU to execute the second update process that is the remaining update process (step S109). In step S109, the CPU 11 generates a necessary frame, and causes the in-vehicle communication unit 14 to transmit the frame to the alternative ECU.

Figure 8:
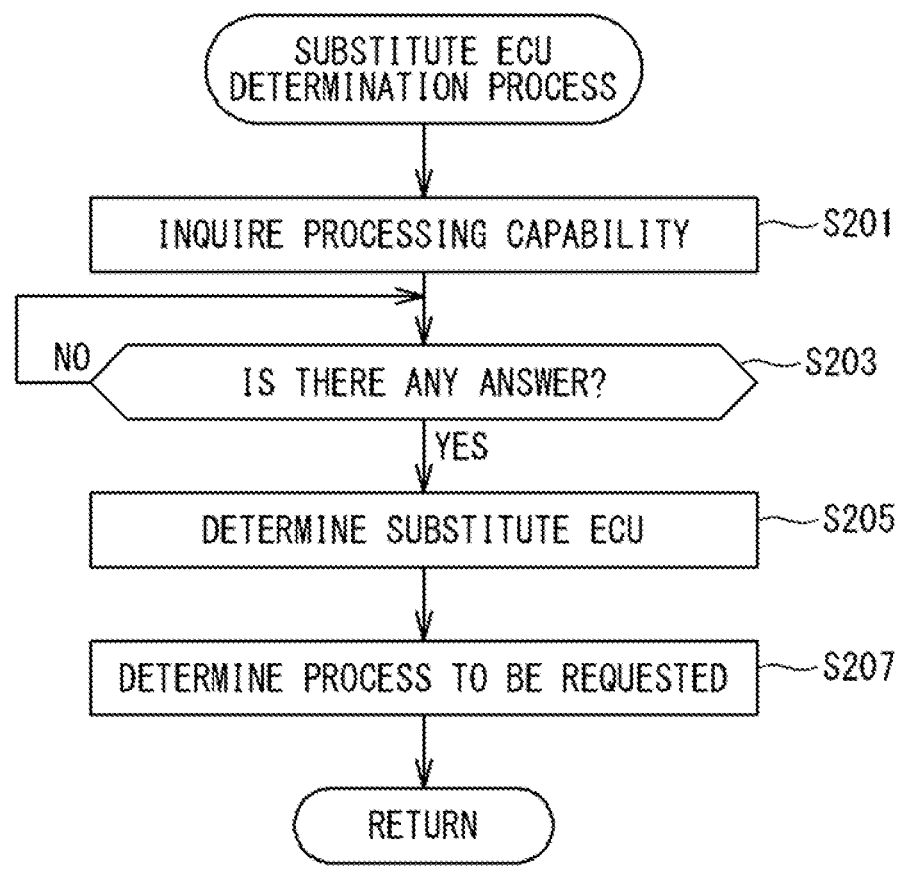
FIG. 8 is a flowchart showing a flow of a determination process at step S103 in FIG. 7.

FIG. 8 is a flowchart showing the flow of the determination process in step S103 shown in FIG. 7. Firstly, the CPU 11 executes the first process (steps S201 to S205) of the determination process to determine an alternative ECU. With reference to FIG. 8, the CPU 11 inquires of a plurality of ECUs 30 other than the target ECU about the dynamic processing capabilities (utilization rates of the CPUs 31) (step S201). In step S201, the CPU 11 generates a necessary frame, and causes the in-vehicle communication unit 14 to transmit the frame to the plurality of ECUs 30 other than the target ECU. Preferably, the CPU 11 inquires of the plurality of ECUs other than the target ECU in accordance with the priority levels stored in advance.

When there is an ECU 30 that has answered to the inquiry made in step S201 (YES in step S203), the CPU 11 determines, as an alternative ECU, the ECU 30 that has answered the dynamic processing capability (step S205).

When the alternative ECU has been determined, the CPU 11 executes the second process of the determination process to determine a process to be alternatively executed by the alternative ECU (step S207).

[Effects of the First Embodiment]

In the program updating system according to the first embodiment, when the gateway 10 has downloaded the update program from the DL server 6, if the target ECU is unable to execute the update process, another ECU 30 receives the update program and alternatively executes at least a part of the update process.

In the program updating system according to the comparative example, the gateway 10 retains the update program until the period T1 has passed and the target ECU has become able to execute the update process. Therefore, the longer the period T1 is, the more the memory in the gateway 10 is burdened. In particular, in the case where a plurality of update programs for a plurality of ECUs have been downloaded and none of the target ECUs are able to execute the update process, the burden on the memory in the gateway 10 becomes a serious problem.

In contrast to the comparative example, in the program updating system according to the first embodiment, the update program is transmitted from the gateway 10 to another ECU during the period T1. That is, the update program is dispersedly stored. Therefore, the memory in the gateway 10 is prevented from being burdened.

Furthermore, in the program updating system according to the comparative example, since the update process is started after the period T1 has shifted to the period T2 and the target ECU has entered the update executable state, the processing time D1 in the target ECU is increased. As a result, completion of the online update is delayed.

In contrast to the comparative example, in the program updating system according to the first embodiment, at least a part (first update process) of the update process is performed by the alternative ECU during the period T1. After the period T1 has passed, the remaining update process (second update process) is performed in the target ECU. Therefore, the processing time D2 in the target ECU is shorter than the processing time D1. As a result, completion of the online update is inhibited from being delayed.

<Modification 1>

In the example of FIG. 6, when the target ECU has entered the update executable state, the gateway 10 acquires the result of the first update process performed in the alternative ECU, and transmits the result of the process to the target ECU. However, transmission of the result of the process to the target ECU is not limited to this method. The gateway 10 may instruct the alternative ECU to transmit the result of the first update process to the target ECU. Thus, efficiency of the data transmission is improved. This also applies to the following embodiments.

<Modification 2>

There may be a plurality of alternative ECUs. That is, in the first process of the determination process, the determination unit 112 may determine a plurality of ECUs in which the utilization rates of the CPUs 31 are not higher than the threshold value, as alternative ECUs. In this case, in the second process, the determination unit 112 determines processes to be alternatively executed by the respective alternative ECUs. Then, according to the order of the processes, the update control unit 111 transmits, to an alternative ECU that will alternatively execute a following process, a process result obtained in an alternative ECU that has executed a preceding process, and then requests execution of the following process.

Since a plurality of ECUs are used as alternative ECUs, the burden on the process of each alternative ECU can be reduced.

Second Embodiment

In the program updating system according to the first embodiment, the gateway 10 functions as the update control device to execute the update control process described above. However, the update control device is not limited to the gateway 10. In another example, a target ECU may function as the update control device to execute the update control process for controlling update by itself. In this case, in order to execute the update control process, the CPU 31 of the target ECU includes an update control unit 311 corresponding to the update control unit 111 as shown in FIG. 3. Further, the update control unit 311 includes a determination unit 312 corresponding to the determination unit 112.

Figure 9:
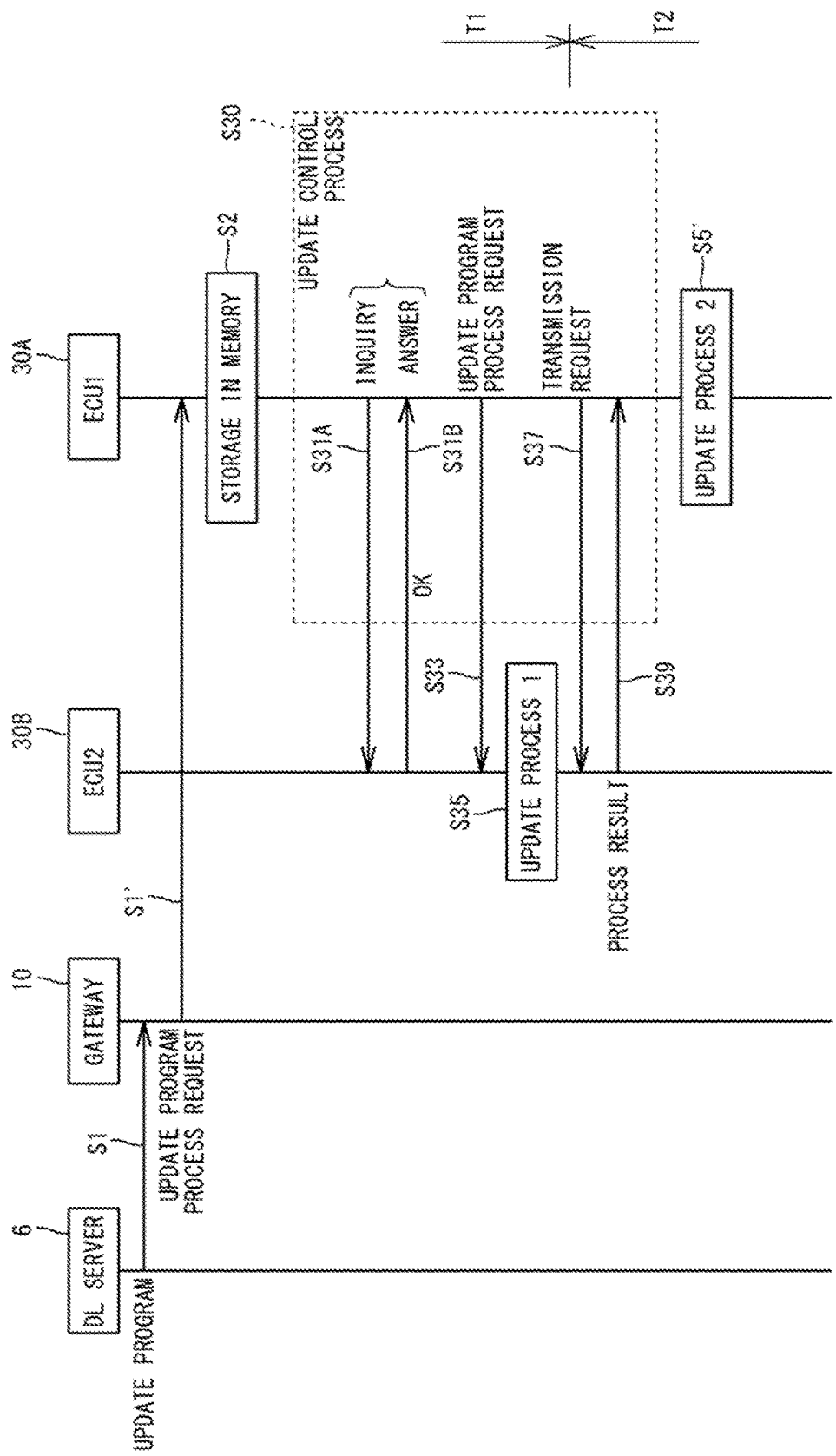
FIG. 9 is a sequence diagram showing an example of a flow of online update of a control program which is executed in a program updating system according to a second embodiment.

FIG. 9 is a sequence diagram showing an example of a flow of online update of a control program which is executed in a program updating system according to a second embodiment. In FIG. 9, the same operations as in the flow of the online update shown in FIG. 6 are represented by the same step numbers.

With reference to FIG. 9, in the program updating system according to the second embodiment, the gateway 10 downloads an update program from the DL server 6 (step S1), and transmits the update program to a target ECU to request update (step S1').

The target ECU stores the received update program in the storage unit 33 (step S2). The target ECU executes the update control process during the period T1 (step S30). That is, in this second embodiment, the target ECU inquires of other ECUs 30 about the dynamic processing capabilities (utilization rates of the CPUs 31) thereof (step S31A). When there are ECUs 30 that have answered the inquiry (step S31B), the target ECU determines an alternative ECU from among the ECUs 30. Further, the target ECU determines a process to be executed by the alternative ECU. Then, the target ECU transmits the update program to the alternative ECU, and requests the first update process (step S33).

When the period T2 has arrived and the target ECU has entered the update executable state, the target ECU requests the result of the first update process from the alternative ECU (step S37), and acquires the result of the process (step S39). The target ECU executes the second update process by using the result of the first update process acquired from the alternative ECU (step S5').

In the program updating system according to the second embodiment, the memory in the target ECU can be prevented from being burdened, in contrast to the case where the update program is stored in the target ECU until the update unexecutable state shifts to the update executable state. In addition, since the processing time in the target ECU can be reduced as in the program updating system according to the first embodiment, completion of the online update can be inhibited from being delayed.

Third Embodiment

As still another example of an update control device, the management server 5 may function as the update control device. Therefore, in a program updating system according to a third embodiment, the CPU 51 of the management server 5 includes, as shown in FIG. 4, an update control unit 511 corresponding to the update control unit 111 in order to execute the update control process. Further, the update control unit 511 includes a determination unit 512 corresponding to the determination unit 112.

Figure 10:
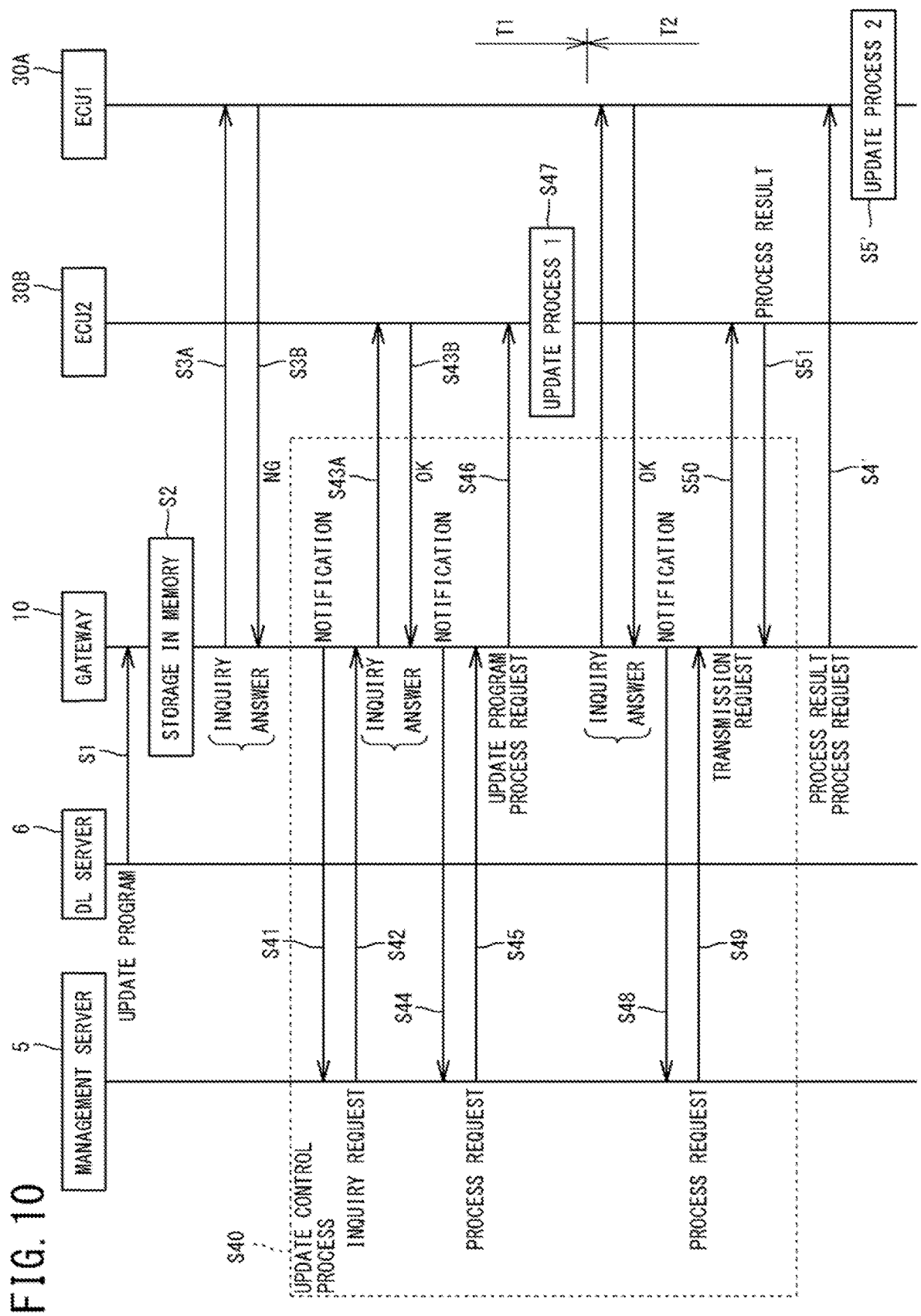
FIG. 10 is a sequence diagram showing an example of a flow of online update of a control program which is executed in a program updating system according to a third embodiment.

FIG. 10 is a sequence diagram showing an example of a flow of online update of a control program which is executed in the program updating system according to the third embodiment. In FIG. 10, the same operations as in the flow of the online update shown in FIG. 6 are represented by the same step numbers.

With reference to FIG. 10, in the program updating system according to the third embodiment, the gateway 10 downloads an update program from the DL server 6 (step S1), and inquires of the target ECU about its state, as in the online update according to the first embodiment (step S3A). This inquiry may be performed in response to a request from the management server 5. When the target ECU is in the update unexecutable state (step S3B), the gateway 10 notifies the management server 5 that the target ECU is in the update unexecutable state (step S41).

Upon receiving the notification from the gateway 10, the management server 5 executes the update control process (step S30). The management server 5 requests the gateway 10 to perform inquiry about dynamic processing capability (step S42). In response to the request, the gateway 10 inquires of ECUs other than the target ECU about the dynamic processing capabilities (utilization rates of the CPUs 31) thereof (step S43A). Upon receiving an answer to the inquiry, the gateway 10 notifies the management server 5 of the answer (step S44).

Based on the notification from the gateway 10, the management server 5 executes the first process of the determination process to determine an alternative ECU. In addition, the management server 5 executes the second process of the determination process to determine a process of which execution is requested to the alternative ECU. Then, the management server 5 requests the gateway 10 to make a request to the corresponding ECU 30 as the alternative ECU for execution of the first update process (step S45). In response to the request, the gateway 10 transmits the update program to the alternative ECU, and requests the first update process (step S46).

When the period T2 has arrived and an answer that the target ECU is in the update executable state has been obtained, the gateway 10 transmits notification to the management server 5 (step S48). Upon receiving this notification, the management server 5 requests the gateway 10 to make a request to target ECU for execution of the second update process (step S49). In response to the request from the management server 5, the gateway 10 requests the process result from the alternative ECU (step S50), and acquires the process result from the alternative ECU (step S51). The gateway 10 transmits the process result to the target ECU, and requests the second update process (step S4'). Thus, the second update process is executed in the target ECU (step S5').

In the program updating system according to the third embodiment, the memory in the gateway 10 can be prevented from being burdened, in contrast to the online update of the comparative example. In addition, since the processing time in the target ECU can be reduced as in the program updating system according to the first embodiment, completion of the online update can be inhibited from being delayed.

The disclosed feature is implemented by one or more modules. For example, the feature can be implemented by: hardware modules such as circuit elements, etc.; software modules defining processes that realize the feature; or a combination of the hardware modules and the software modules.

The disclosed feature may be provided as a program, which is a combination of one or more software modules, for causing a computer to execute the aforementioned operation. Such a program may be recorded in a computer-readable recording medium, such as a flexible disc, a CD-ROM (Compact Disk-Read Only Memory), an ROM, an RAM, a memory card, or the like adjunct to the computer, and provided as a program product. Alternatively, the program may be provided by being recorded in a recording medium such as a hard disk incorporated in the computer. The program may also be provided by being downloaded through a network.

The program according to the present disclosure may call up necessary modules in a predetermined array at a predetermined timing from among program modules provided as a portion of an operating system (OS) of a computer, and may cause processing to be executed. In this case, the modules are not included in the program itself, and the processing is executed in cooperation with the OS. The program according to the present disclosure also includes such a program including no modules.

The program according to the present disclosure may be provided by being incorporated in a portion of another program. In that case as well, modules included in the other program are not included in the program itself, and processing is executed in cooperation with the other program. The program according to the present disclosure also includes such a program incorporated in another program. A program product to be provided is installed in a program storage unit such as a hard disk, and then executed. The program product includes the program itself and a recording medium in which the program is recorded.

It is noted that the embodiments disclosed herein are merely illustrative in all aspects and should not be recognized as being restrictive. The scope of the present invention is defined not by the above description but by the scope of the claims, and is intended to include meaning equivalent to the scope of the claims and all modifications within the scope.

REFERENCE SIGNS LIST 1 vehicle
2 wide-area communication network
4 in-vehicle network
5 management server
6 DL server
10 gateway
11 CPU
12 RAM
13 storage unit
14 in-vehicle communication unit
15 wireless communication unit
16, 16A, 16B in-vehicle communication line
30 ECU
31 CPU
32 RAM
33 storage unit
34 communication unit
35 start-up unit
51 CPU
52 ROM
53 RAM
54 storage unit
55 communication unit
111 update control unit
112 determination unit
311 update control unit
312 determination unit
511 update control unit
512 determination unit

The invention claimed is:

1. A hardware update control device comprising:
 a hardware communication unit configured to communicate with a plurality of on-vehicle control devices via a transmission path including an in-vehicle communication line; and
 a hardware processor coupled to a memory and configured to read instructions from the memory to cause the hardware update control device to perform operations including:

causing the hardware communication unit to transmit a first request message when a target device is unable to execute an update process for a control program that is to be updated, the update process including a plurality of processes that is started after the target device has received data for the update process for the control program, the plurality of processes being executable in the target device, the first request message requesting an alternative device, which is a non-target device, to alternatively execute a process included in the plurality of processes; and causing the hardware communication unit to transmit a second request message when the target device has entered a state where the target device is able to execute the update process for the control program after the alternative device starts to alternatively execute the process included in the plurality of processes, the second request message requesting the target device to execute a remaining process included in the plurality of processes, wherein the target device is a first on-vehicle control device of the plurality of the on-vehicle control devices including the control program that is to be updated, and the non-target device is a second on-vehicle control device of the plurality of the on-vehicle control devices including a control program that is not to be updated.

2. The hardware update control device according to claim 1, wherein the operations further include:

causing the hardware communication unit to transmit, to the non-target device, an inquiry message that inquires whether or not the non-target device can serve as the alternative device; and determining whether or not to use the non-target device as the alternative device, in accordance with a content of a response message from the non-target device.

3. The hardware update control device according to claim 2, wherein the causing of the hardware communication unit to transmit the inquiry message includes transmitting the inquiry message to a plurality of non-target devices inquiring as to whether or not the non-target devices can serve as the alternative device, in accordance with priority levels of the non-target devices.

4. The hardware update control device according to claim 2, wherein in response to the response message indicating that dynamic processing capability is not lower than a predetermined value, the hardware processor determines, as the alternative device, the non-target device that has transmitted the response message.

5. The hardware update control device according to claim 4, wherein the hardware processor determines the alternative device from among a plurality of non-target devices that have transmitted response messages, in accordance with priority levels of the non-target devices.

6. The hardware update control device according to claim 5, wherein in a case where a plurality of in-vehicle communication lines are terminated at the hardware communication unit and the hardware communication unit does not have a function of selectively activating devices connected to the in-vehicle communication lines, the operations further include regarding a first non-target device that is connected to an in-vehicle communication line to which the target device is connected, to be higher in priority than a second non-target device that is connected to an in-vehicle communication line to which the target device is not connected.

7. The hardware update control device according to claim 5, wherein the hardware processor regards a first non-target device that has a control function unrelated to traveling of a vehicle, to be higher in priority than a second non-target device that has a function other than the control function.

8. The hardware update control device according to claim 1, wherein the operations include determining a process, among the plurality of processes, that the alternative device is requested to alternatively execute.

9. The hardware update control device according to claim 1, wherein the plurality of processes includes at least one of (i) obtaining a compressed file by decoding an encoded file, (ii) decompressing the compressed file to obtain an update program, (iii) applying the update program to an old version of the control program that is to be updated, and (iv) writing a new version of the control program over a storage area of the old version of the control program that is to be updated.

10. A control method used in a hardware update control device connected to a plurality of on-vehicle control devices via a transmission path including an in-vehicle communication line, the method comprising, transmitting a first request message when a target device is unable to execute an update process for a control program that is to be updated, the update process including a plurality of processes that is started after the target device has received data for the update process for the control program, the plurality of processes being executable in the target device, the first request message requesting an alternative device, which is a non-target device, to alternatively execute a process included in the plurality of processes; and transmitting a second request message when the target device has entered a state where the target device is able to execute the update process for the control program after the alternative device starts to alternatively execute the process included in the plurality of processes, the second request message requesting the target device to execute a remaining process included in the plurality of processes, wherein the target device is a first on-vehicle control device of the plurality of the on-vehicle control devices including the control program that is to be updated, and the non-target device is a second on-vehicle control device of the plurality of the on-vehicle control devices including a control program that is not to be updated.

11. The control method of claim 10, wherein the plurality of processes includes at least one of (i) obtaining a compressed file by decoding an encoded file, (ii) decompressing the compressed file to obtain an update program, (iii) applying the update program to an old version of the control program that is to be updated, and (iv) writing a new version of the control program over a storage area of the old version of the control program that is to be updated.

12. A non-transitory computer readable storage medium storing a computer program for causing a computer to function as an update control device connected to a plurality of on-vehicle control devices via a transmission path including an in-vehicle communication line, the computer program causing the computer to perform operations including:

transmitting a first request message when a target device is unable to execute an update process for a control program that is to be updated, the update process including a plurality of processes that is started after the target device has received data for the update process for the control program, the plurality of processes being executable in the target device, the first request message requesting an alternative device, which is a non-target device, to alternatively execute a process included in the plurality of processes; and transmitting a second request message when the target device has entered a state where the target device is able to execute the update process for the control program after the alternative device starts to alternatively execute the process included in the plurality of processes, the second request message requesting the target device to execute a remaining process included in the plurality of processes, wherein the target device is a first on-vehicle control device of the plurality of the on-vehicle control devices including the control program that is to be updated, and the non-target device is a second on-vehicle control device of the plurality of the on-vehicle control devices including a control program that is not to be updated.

13. The non-transitory computer readable storage medium of claim 12, wherein the plurality of processes includes at least one of (i) obtaining a compressed file by decoding an encoded file, (ii) decompressing the compressed file to obtain an update program, (iii) applying the update program to an old version of the control program that is to be updated, and (iv) writing a new version of the control program over a storage area of the old version of the control program that is to be updated.

* * * * *